Oct. 19, 1954
L. B. TAYLOR ET AL
2,692,084
MULTIPLICATION FUNCTION CONTROL DEVICE
Filed May 26, 1951
8 Sheets-Sheet 1
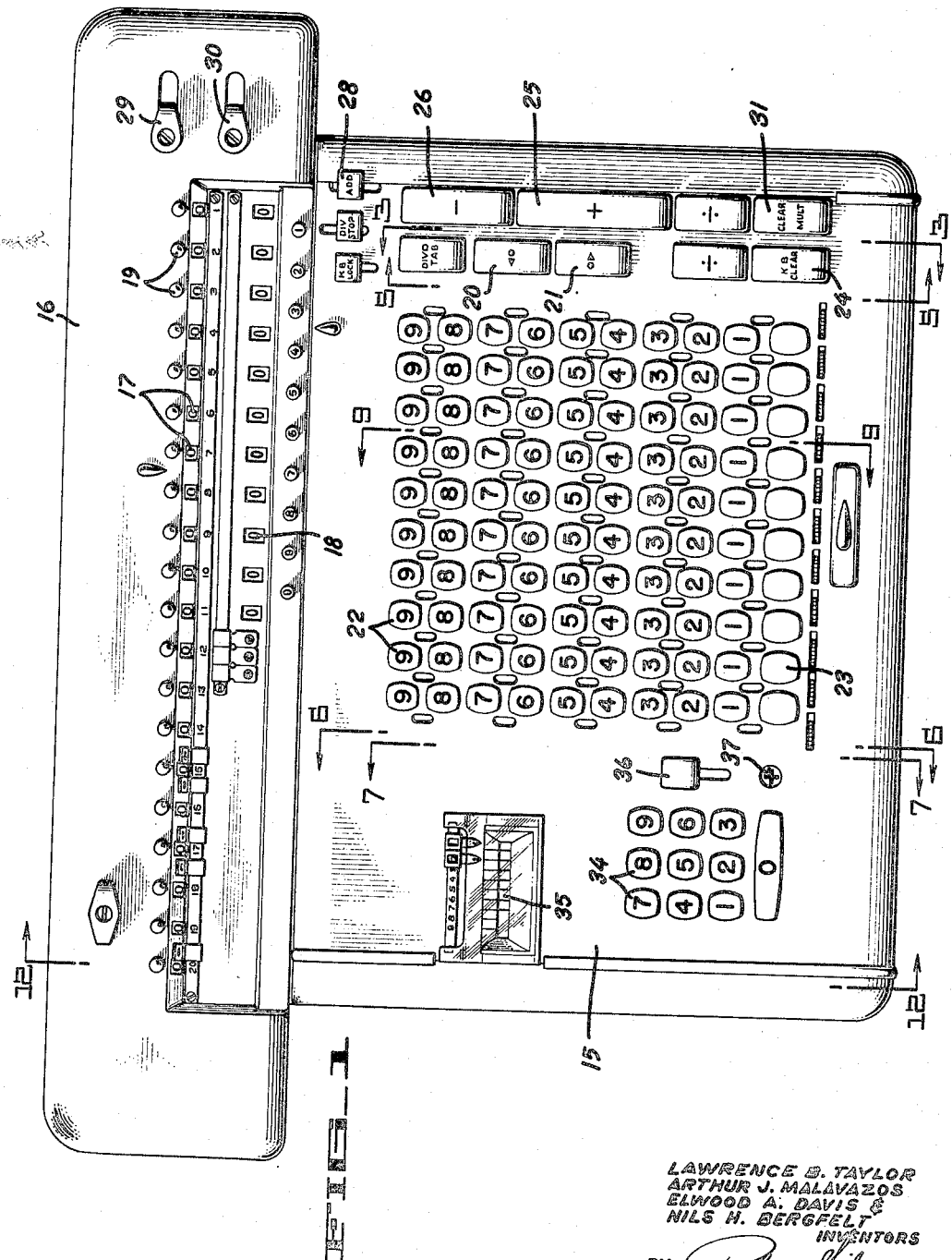
LAWRENCE B. TAYLOR
ARTHUR J. MALAVAZOS
ELWOOD A. DAVIS &
NILS H. BERGFELT
INVENTORS
BY
ATTORNEY

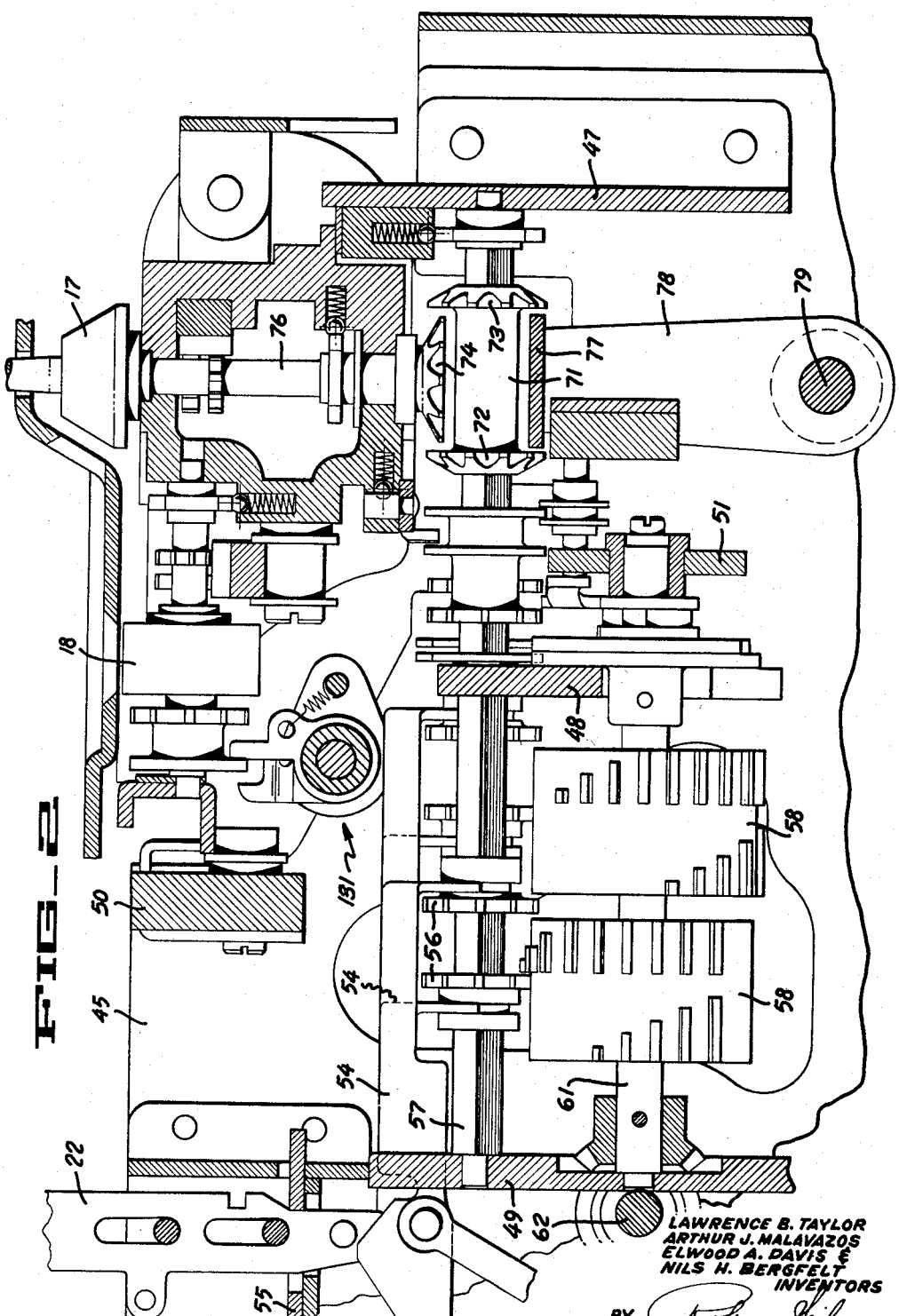

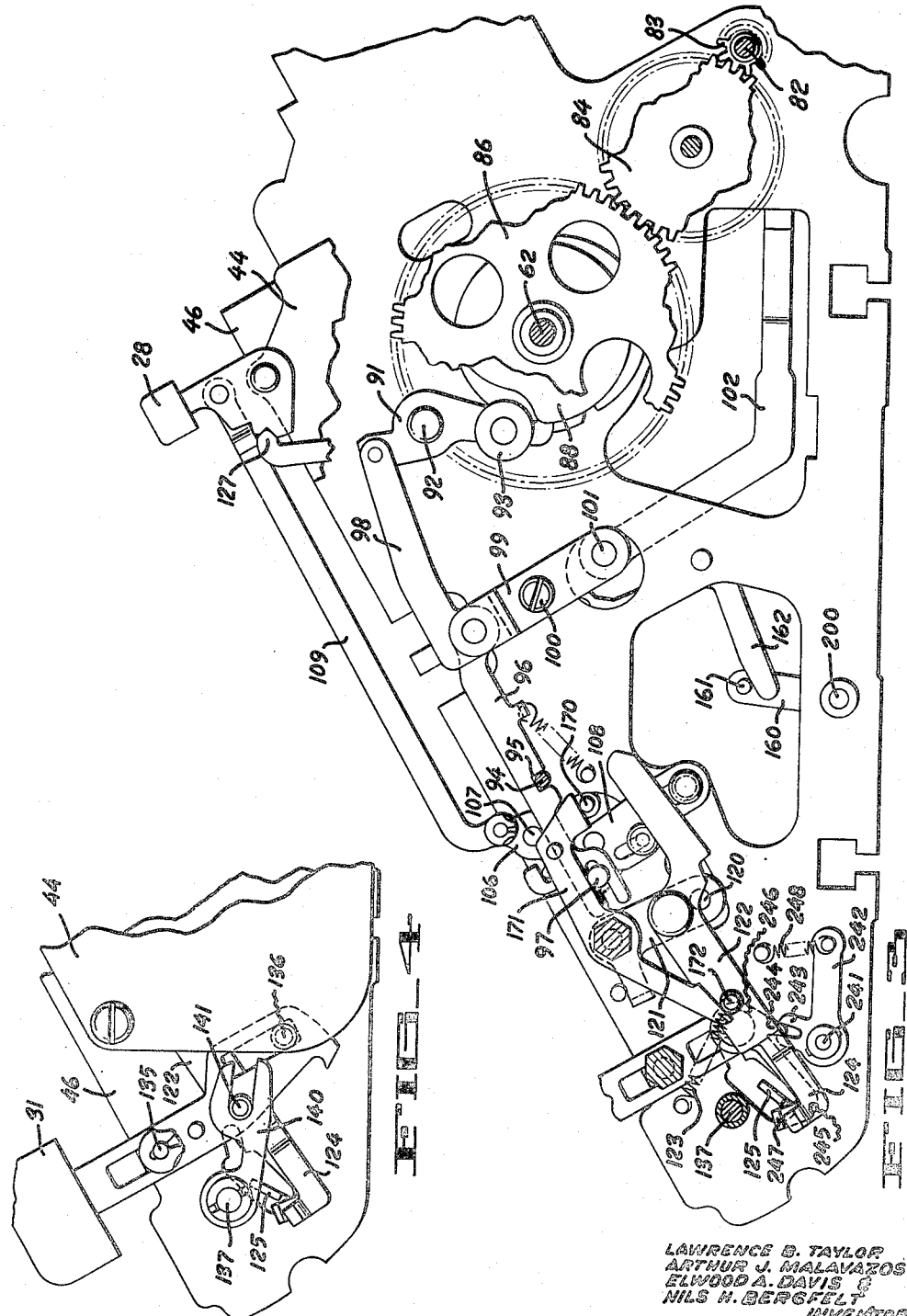

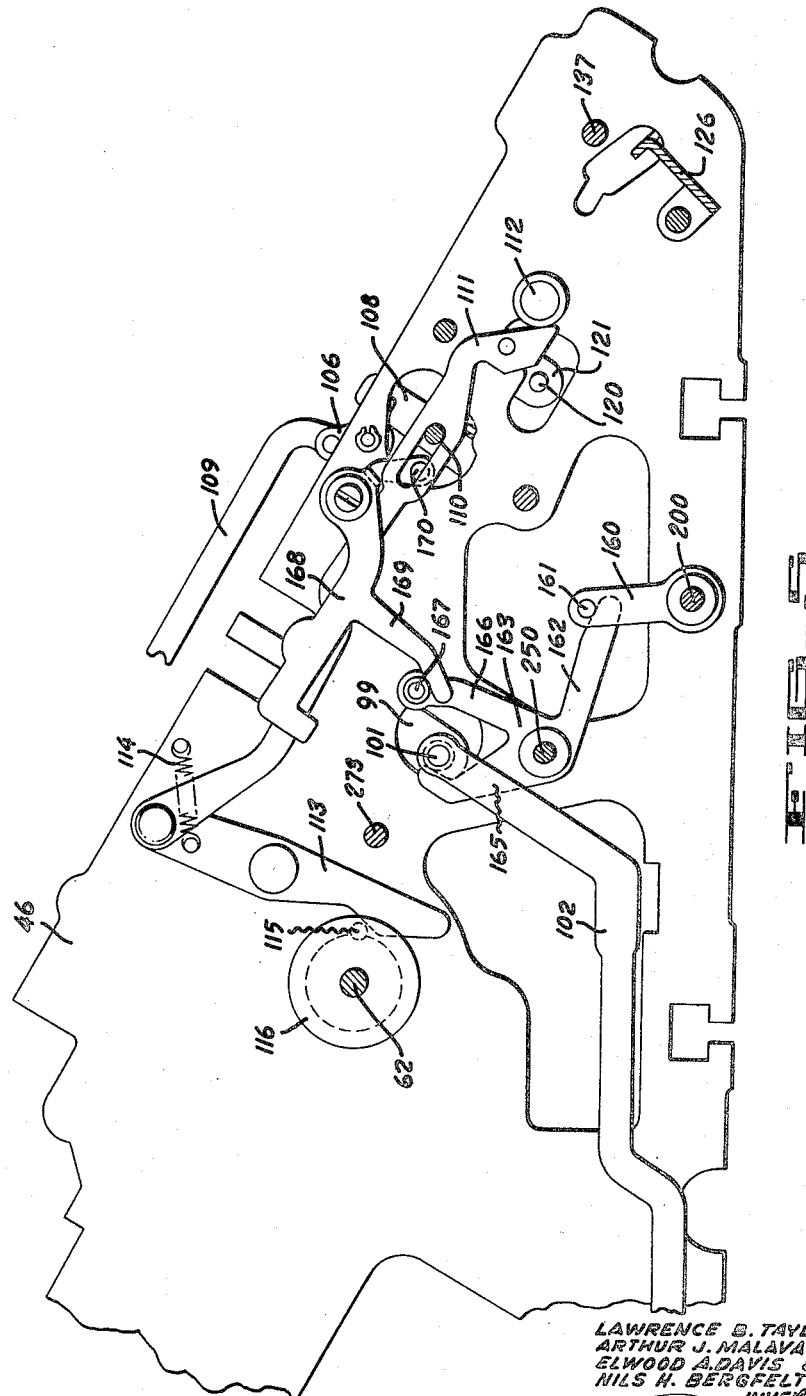

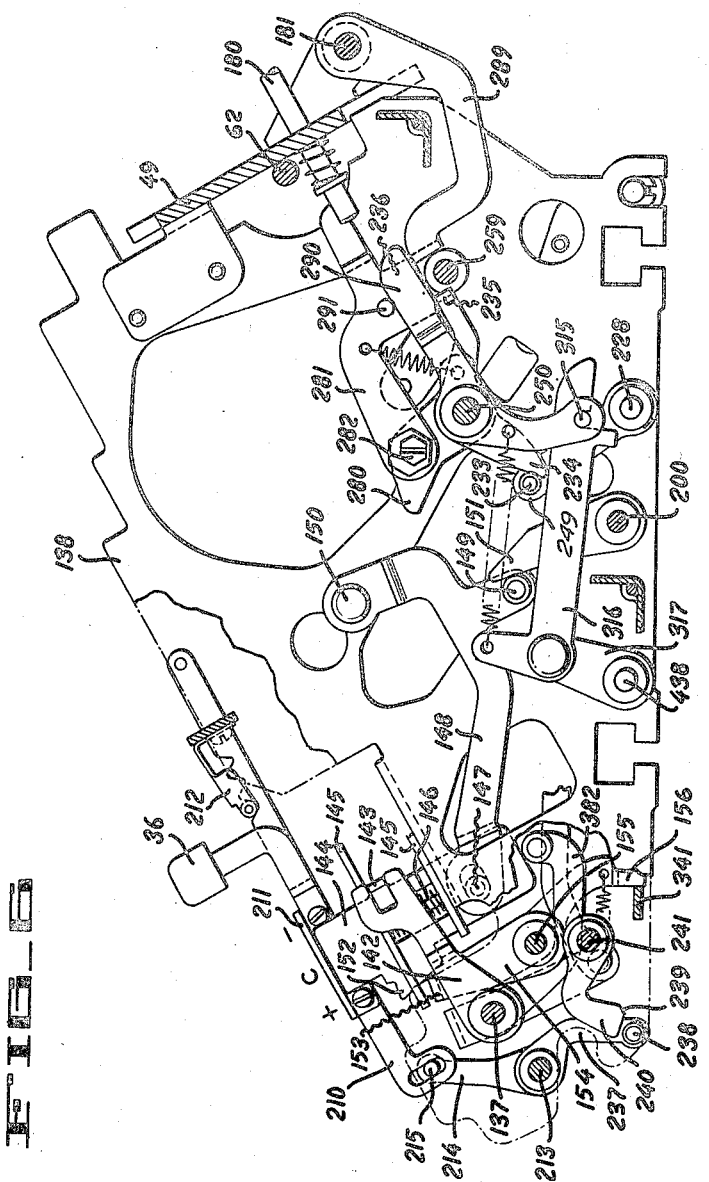

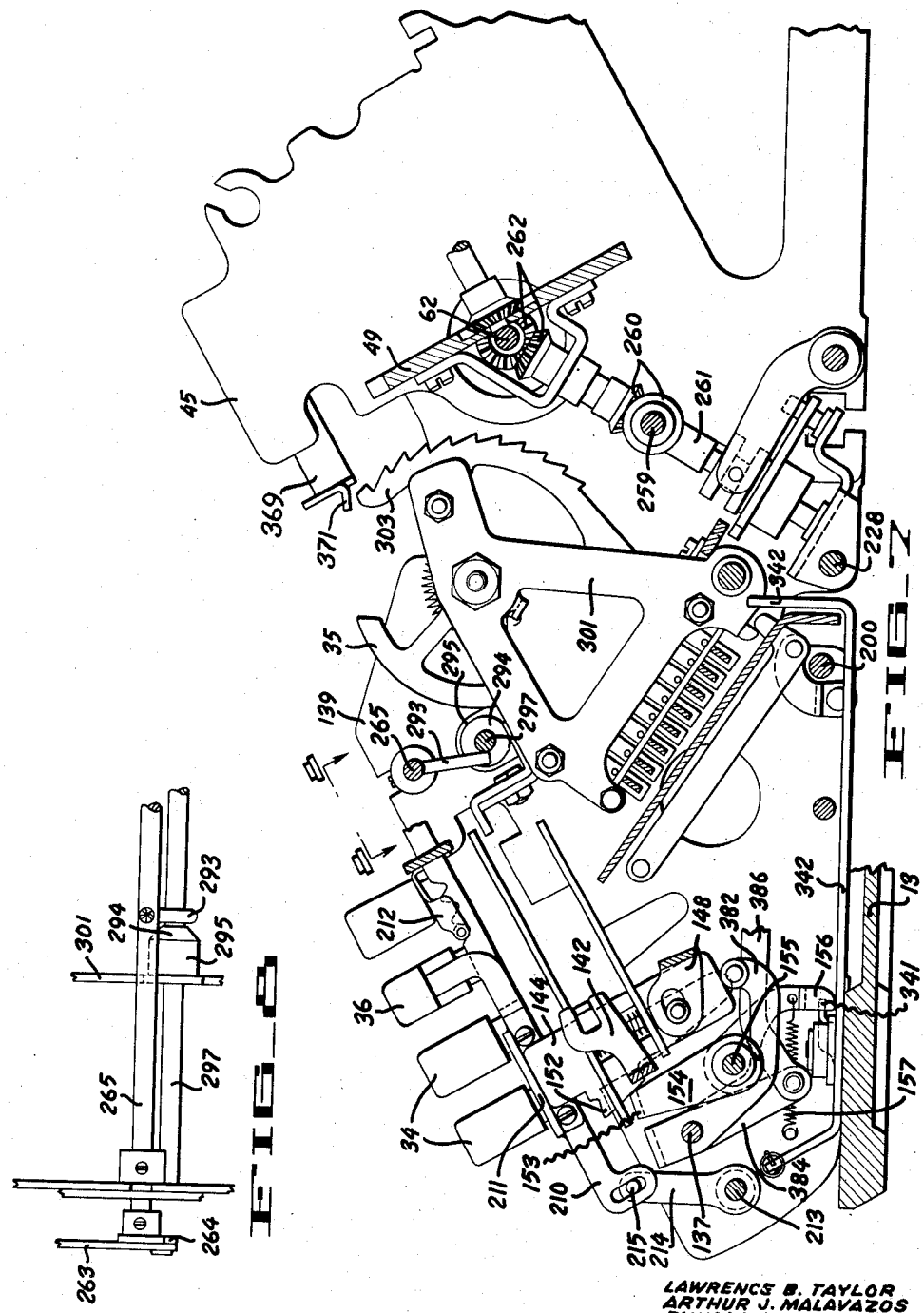

Oct. 19, 1954
L. B. TAYLOR ET AL
2,692,084
MULTIPLICATION FUNCTION CONTROL DEVICE
Filed May 26, 1951
8 Sheets-Sheet 7
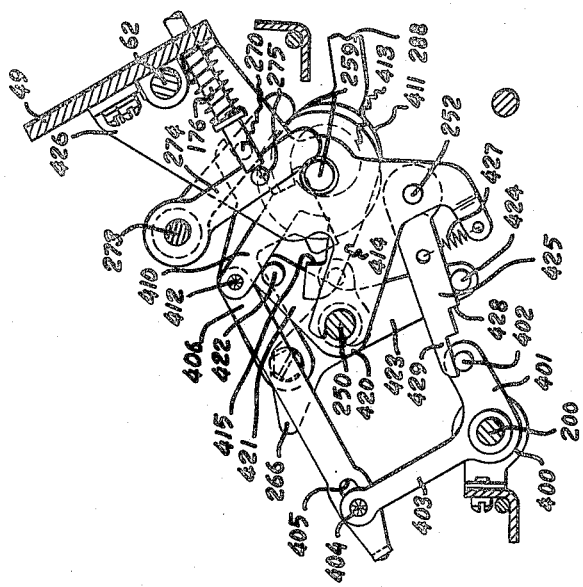
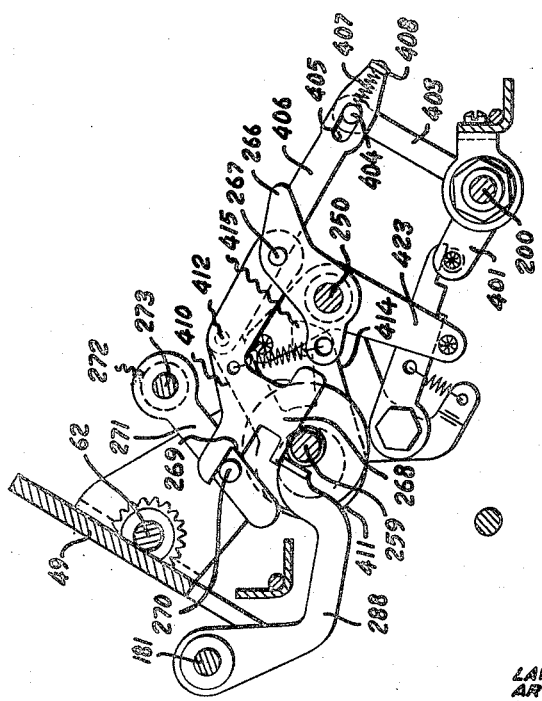
LAWRENCE B. TAYLOR
ARTHUR J. MALAVAZOS
ELWOOD A. DAVIS &
NILS H. BERGFELT
INVENTORS
BY Robyn Wiley
ATTORNEY

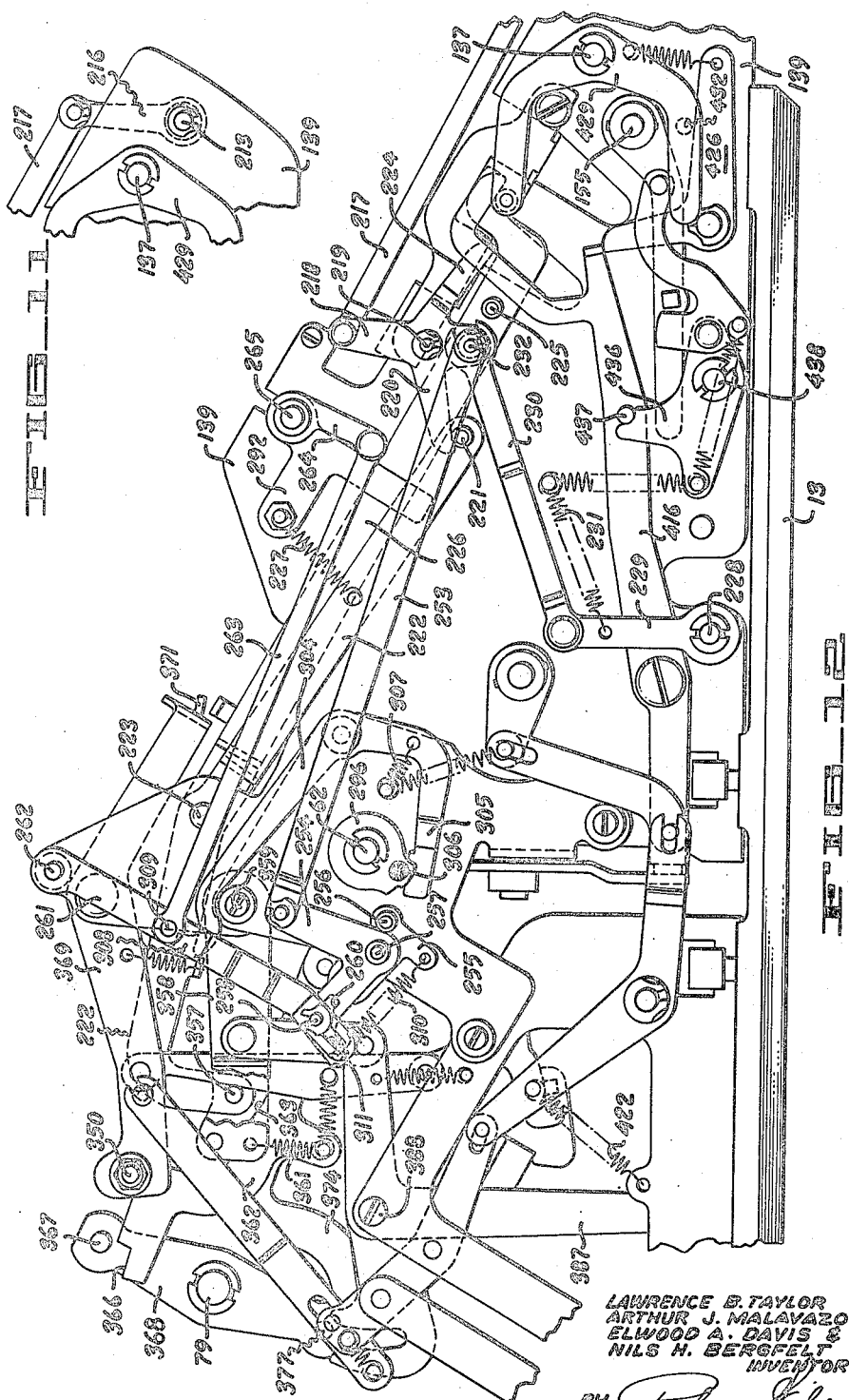

Patented Oct. 19, 1954

2,692,084

UNITED STATES PATENT OFFICE 2,692,084

MULTIPLICATION FUNCTION CONTROL DEVICE

Lawrence B. Taylor, Hillsborough, Arthur J. Malavazos, Oakland, Elwood A. Davis, Castro Valley, and Nils H. Bergfelt, San Leandro, Calif., assignors to Friden Calculating Machine Co., Inc., a corporation of California Application May 26, 1951, Serial No. 228,404

10 Claims. (Cl. 235—63)

This invention relates to calculating machines and is concerned more particularly with a provision of improved means for performing plural order multiplication operations.

It is an object of the invention to provide an improved means by which plural order multiplying operations can be carried out in a simplified manner.

Another object of the invention is to provide an improved calculating machine in which the multiplying operations can be selectively controlled by means of a manually operable key to determine the characteristics of the operations to be performed.

Another object of the invention is to provide an improved multiplying mechanism for a calculating machine in which the accumulator can be preselectively conditioned automatically for a multiplying operation.

Another object of the invention is to provide an improved calculating machine of the character referred to in which a multiplying operation of predetermined characteristics or zeroizing of the accumulator registers can be selectively controlled with one manually operable control key.

Other objects and advantages will be apparent from the following description of a preferred embodiment of the invention as illustrated in the accompanying drawings, in which:

Fig. 1 is a plan view of a calculating machine.

Fig. 2 is a longitudinal sectional elevation taken through the machine.

Fig. 3 is an elevational view of the right side frame taken on the line 3—3 in Fig. 1.

Fig. 4 is a fragmentary view taken to the right of line 3—3 in Fig. 1 to include the multiply control key.

Fig. 5 is an elevational view of the right side frame taken on the line 5—5 in Fig. 1 looking in the direction of the arrows.

Fig. 6 is a sectional elevation of the machine taken on the line 6—6 in Fig. 1 with a portion of the side frame broken away to show certain mechanisms.

Fig. 7 is a sectional elevational view taken to the left of line 6—6 and indicated at line 7—7 in Fig. 1.

Fig. 8 is a detailed plan of a part of the mechanism shown in Fig. 7 and is taken on the line 8—8 in Fig. 7.

Fig. 9 is an elevational view of the power setting unit taken on the line 9—9 in Fig. 1.

Fig. 10 is an elevational view of the power setting unit taken from the left side looking at the machine from the front.

Fig. 11 is a complementary view to Fig. 12 taken on the line 12—12 in Fig. 1.

Fig. 12 is a view of the left side frame taken on the line 12—12 in Fig. 1 showing a portion of the multiplication mechanism.

This invention is illustrated in connection with the type of calculating machine having unidirectional actuators and reversible numeral wheels, as disclosed in Patent No. 2,229,889 issued to Carl M. F. Friden January 28, 1941.

General description

Referring to Fig. 1 the machine includes a body 15 in which the actuating, selecting, and control mechanisms are mounted, and a carriage 16 which is mounted for endwise shifting movement transversely of body 15 and which carries numeral wheels 17 and 18 of the accumulator and revolutions counter, respectively. Numeral wheels 17 are provided with projecting twirlers 19 to provide for individual setting thereof. Carriage 16 can be shifted by power in either direction by manipulation of respective shift keys 20 and 21 through mechanism described in the patent to Anthony B. Machado No. 2,650,761 issued September 1, 1953.

Values are entered into the machine by depression of numeral keys 22 of the usual keyboard in the various ordinal rows thereof, keys 22 being releasable individually by depression of ordinal clear keys 23, or collectively by depression of keyboard clear key 24. Values introduced into the machine may be registered additively or subtractively on accumulator numeral wheels 17 by depression of plus key 25 or minus key 26, respectively. If desired, "add" key 28 may be moved forwardly to cause clearing of the keyboard in the usual manner after a single registration in the accumulator.

Values registered in numeral wheels 17 and 18 can be erased, i. e., the registers can be zeroized, by manipulation of respective manually operable resetting handles 29, 30, or by power through depression of return and clear key 31. Depression of key 31 serves to control either one of two operations preselectively, that of initiating a multiplying operation, which will be described hereinafter or effecting a return of carriage 16 to the farthest left position and subsequently resetting both the accumulator 17 and the counter 18 to "0." Either or neither of the numeral wheels 17 or 18 may be reset depending upon the setting of resetting handles 29 and 30 which are adjustable to control selective resetting in a well-known manner.

The machine is adapted to perform automatic predetermined multiplication by depression of predetermined multiplication selection keys 34 to set up the desired multiplier figure as indicated on dials 35 and then depressing key 31. The sign character of the product to be registered in the numeral wheels 17 is predetermined by a manual selection control key 36 which is located adjacent the multiplier selection keys 34. Normally the control key 36 is positioned for a product with a positive sign character, as indicated by the plus sign in the view window 37. The second position of the control key 36 conditions the multiplication mechanism for a multiplier correction operation, in which an erroneous multiplier factor is removed from the multiplier selection mechanism. In moving the key 36 downwardly to the third position, the multiplication mechanism is conditioned for a negative sign character registration in the product dials 17. After conditioning the multiplication mechanism for a multiplier correction or negative multiplication operation it is then only necessary to depress the control key 31 to initiate the preselected operation. The multiplying mechanism and the associated control means form the principle subject matter of the instant invention, and are described later in detail.

With the above general organization of parts in mind, various of the above-noted mechanisms will be described in detail insofar as being necessary or desirable to an understanding of the present invention, it being understood that the mechanism which is not described fully may be of conventional construction, such as that disclosed in the patents to Friden Nos. 2,399,917 and 2,371,752.

*Selecting and actuating mechanism*

Within casing 15, the frame includes left and right side frames 45, 46 (Figs. 2, 4 and 10), which are suitably mounted on base 13 and are interconnected by various crossframe members including transverse brackets 47, 48, 49, and 50 for supporting various mechanisms including the selecting and actuating mechanisms.

The values to be introduced into the accumulator numeral wheels 17 are selected by means of a plurality of similar orders of selecting mechanism associated with numeral keys 22. For this purpose each bank or order of keys 22 (Fig. 2) cooperates with a pair of similar parallel spring-urged value selecting slides 54 mounted for endwise movement by a suitable supporting linkage and extending through suitable slots in crossframe 49. Each slide 54 is provided with cam surfaces of varying inclinations for cooperation with suitable pins on certain keys 22 to effect a differential movement of slide 54 on depression of a key 22. One slide 54 of each order cooperates with the "1" to "5" keys 22 of a bank, while the other slide 54 of each order cooperates with the "6" to "9" keys 22 of the bank.

Each bank of keys 22 (Fig. 2) has a latching slide 55 of conventional construction associated therewith to latch any depressed key 22 in depressed position against the tension of the spring associated therewith. To release the pressed numeral keys, the latching slides 55 may be operated in any convenient manner by zero and clear keys 23 and 24, and by power as controlled by movement of "add" key 28 as later described.

Each selecting slide 54 (Fig. 2) is connected at its rear end with a 10-tooth gear 56 slidably and nonrotatably mounted on longitudinal square shaft 57, whereby a movement of slide 54 serves to position the associated gear 56 on shaft 57 with respect to the stepped teeth of the associated actuating drum 58 in accordance with the value of the depressed numeral key 22. A pair of actuating drums 58 for adjacent orders of the machine are mounted on each longitudinal actuating shaft 61, which is suitably journalled in cross plates 49 and 51 and has a suitable bevel gear connection with transverse shaft 62. Shaft 62 is operable cyclically in a single direction from clutch control driving means as described hereinafter to provide the only path of power flow from the motor.

As seen in Fig. 2, a pair of square shafts 57 associated with each actuating shaft 61 are positioned above and to either side thereof, while the sets of gears 56 on respective square shafts 57 are offset longitudinally of the machine for cooperation with the similarly offset actuating drums 58. By the above arrangement and upon each rotation of the actuating means, a selected number of increments of movement can be imparted to each shaft 57 by the associated actuating cylinder 58 in accordance with the adjusted position of gears 56.

Each shaft 57 is suitably journalled in cross plates 47, 48 and 49, and between plates 47 and 48 has associated therewith selectively settable plus-minus gears for driving an aligned numeral wheel 17. The plus-minus gears of each order of the machine include a spool 71 slidably and nonrotatably mounted on shaft 57 and having opposed 10-tooth bevel gears 72, 73 arranged for selective engagement with gears 74 on numeral wheel shaft 76. The engagement of gears 72 and 73 with gears 74 is controlled by strap 77 which extends transversely of the machine between each set of plus-minus gears 72, 73 and is mounted on similar spaced arms 78 on transverse shaft 79, which is suitably journalled in side frames 45 and 46. Shaft 79 is controlled in a manner hereinafter described to determine positive registration by meshing gears 72 with gears 74, and negative registration by meshing gears 73 with gears 74. In the neutral position shown in Fig. 2, in which gears 72 and 73 may be held normally by suitable spring-urged centralizing means (not shown) associated with strap 77, carriage shifting can be effected.

During both additive and subtractive registration of values in numeral wheels 17, suitable transfer mechanism of conventional construction may be operative to effect the tens-transfer as disclosed, for example, in said Patent No. 2,229,889.

*Plus and minus keys*

As previously stated, the plus and minus keys 25 and 26 (Fig. 1) are adapted to control positive and negative registration in the accumulator, and for this purpose they may be connected by suitable mechanism not disclosed herein to effect rocking of shaft 79 (Fig. 2) whereby plus key 25 serves to mesh gears 72 with numeral wheel gears 74, and minus key 26 serves to mesh minus gears 73 with numeral wheel gears 74. The plus and minus keys also serve to engage the clutch and motor circuit by suitable means.

*Drive mechanism*

As stated above, the actuating means is operable cyclically to effect registration in the accumulator of the values set into the machine by depression of the numeral keys. For this purpose a clutch control drive is provided for the actuating mechanism which preferably forms the only drive means for all power driven parts of the machine. The source of power of the drive means comprises an electric motor provided with drive shaft 82 (Fig. 3) carrying drive gear 83, which is connected by idler gear 84 with gear 86 journalled on transverse shaft 62 and carrying a driving clutch element. Driven clutch element 88 is secured on shaft 62 and becomes operative to drive the machine when the clutch control lever 91 is rocked clockwise about its pivot 92. Lever 91 carries roller 93, which seats in a depression on clutch element 88 in the full-cycle position thereof, and in other positions thereof maintains lever 91 in its clutch-engaging position.

It is seen, therefore, that one or more cycles of operation of the actuating mechanism can be determined by oscillation of clutch control lever 91.

Simultaneously with movement of control lever 91, the circuit for the motor is closed, and for this purpose a slide (not shown) carries a pin 94 and is moved rearwardly upon depression of plus key 25 or minus key 26. Embracing the pin 94 (Fig. 3) is a notch 95 in a link 96 supported at its forward end for endwise sliding movement by a pin-and-slot connection 97 and at its rearward end by a pivotal connection to link 98 and lever 99 pivoted at 100 to side frame 46. Lever 99 is likewise pivotally connected at its lower end by a pin 101 through a suitable opening in the frame 46 with a switch link 102. Thus, rearward movement of link 96, against the urgency of its spring, serves through link 98 to rock control lever 91 clockwise thereby engaging the clutch and through lever 99 and link 102 to close the motor switch (not shown). It will be noted that roller 93 in maintaining control lever 91 in clutch-engaging position when the actuating means is out of full-cycle position also serves to maintain the motor switch closed, so that the motor circuit can be interrupted only in the full-cycle position of the parts.

"Add" key mechanism

As previously explained, when "add" key 28 is rocked forwardly, the keyboard will be cleared at the end of the first cycle of operation upon depression of the plus or minus keys or can be controlled for release at the end of a plural order operation, for example, a multiplying operation, as will be later explained.

Referring to Figs. 3 and 5, "add" key 28 is pivoted for rocking movement on control plate 44, which has been broken away to more clearly show the mechanism previously described. A bellcrank 106 pivoted to side frame 46 at 107 has a knuckle engagement with an arm 108 guided for sliding movement on side frame 46. Pivotally connected to the bellcrank 106 is one end of a link 109, the other end of which is connected to "add" key 28. As seen in Fig. 5, the arm 108 carries a pin 110 engaging a slotted link 111 which is guided at its forward end by engagement with a roller stud 112 and at its rearward end is pivotally connected to a lever 113 urged in a clockwise direction by spring 114. The lower end of lever 113 is adjusted into and out of the path of a pin 115 carried by drum 116 on shaft 62 in accordance with the detented position of the "add" key. When "add" key 28 is rocked forwardly from its normally inactive position and maintained by detent 127, the forward end of the link 111 is moved into operative engagement with a pin 120 (Figs. 3 and 5) carried by bellcrank 121 suitably pivoted on side plate 46. Pivotally mounted on bellcrank 121 is a link 122 which is urged by spring 123 to place the notched end 124 thereof into engagement with an extension 125 of key release bail 126 (Fig. 5) which extends across the front of the machine in operative relation with the front ends of the key latching slides 55.

Thus, when the "add" key 28 is rocked forwardly and link 122 (Fig. 3) is operatively engaged with the extension 125, oscillation of lever 113 by pin 115 (Fig. 5) will cause endwise reciprocation of link 111, oscillation of bellcrank 121, and endwise movement of link 122 to rock the key release bail 126. It will be seen in Fig. 3 that if link 122 is oscillated in a counter-clockwise direction to operatively disengage its notched end 124 from the extension 125 of the key release bail 126, that this movement will be ineffective to release the keyboard until restoration of the link 122 to the position shown in Fig. 3. This control will be described hereinafter.

Revolutions counter

Numeral wheels 18 (Figs. 1 and 2) of the revolutions counter register the number of actuations of the accumulator numeral wheels 17 in a conventional manner by the operation of counter actuator 131, as disclosed, for example, in said Patent No. 2,229,889.

Resetting mechanism

Means are provided for restoring the machine to its normal condition between successive operations by shifting the carriage to a predetermined position and by then effecting zero resetting of either the accumulator or the revolutions counter or both of these registers, as determined by settable control means. This operation is carried out by power driven means under control of a manually operable register return and resetting key. This mechanism is of the general type disclosed in the patent to Carl M. Friden, No. 2,399,917, which issued May 7, 1946, and the aforementioned patent to Machado, No. 2,650,761.

It is to be understood, as previously explained, that key 31 is adapted to perform either of two operations selectively, that of shifting the carriage to the left and zeroizing the registers therein or initiating plural order multiplication. The latter operation is to be described hereinafter.

On depression of key 31 (Figs. 1 and 4) a drive connection is established between the power driven resetting mechanism and the actuating means to initiate a carriage shifting and register resetting operation. Key 31 is guided for endwise movement by a spacer stud 135 on side frame 46 and at its lower end by a stud 136 on side frame 44. A transversely extending shaft 137, journalled in side frame 46, auxiliary left side frame 138, and vertical frame plate 139, has secured at its right end an arm 140 (Fig. 4), the bifurcated end of which engages a roller stud 141 on the key 31. Thus, depression of key 31 imparts a clockwise rocking motion to shaft 137 and an arm 142 (Figs. 6 and 7) pinned thereto intermediate its ends. At its outer end, arm 142 is forked to engage an ear 143 formed at right angles on a member 144 which is mounted for endwise movement in the multiplier keyboard plates 145 and normally urged to the position shown by a spring 146.

The left shift and zero resetting mechanisms become effective under power with the opening of the driving clutch and closing of the motor switch to shift the carriage to its leftmost position and to zeroize the accumulator and revolutions counter registers. For this operation a downward movement of the member 144 (Fig. 6) and a roller 147 thereon which engages a slot in one end of lever 148, rocks the lever 148 counter-clockwise about its pivot 150 on frame plate 138. The roller 149 on the lever 148 serves, therefore, to impart a clockwise rotation to shaft 200 through an arm 151 pinned thereto.

Latching means is provided to hold the member 144 depressed until the conclusion of the operation being performed. For this purpose the member 144 has a V nose 152 formed thereon for engagement with an ear 153 of latch arm 154. The shaft 155, at one end of which arm 154 is pinned, is journalled in side frames 138 and 139. The other end of shaft 155 has secured thereto a latch release arm 156 which is urged clockwise together with latch arm 154 by a spring 157. Means for releasing the latch 154 and thus member 144 will be described hereinafter.

Referring now to Fig. 5, counter-clockwise rocking of shaft 200 is utilized to engage the clutch and close the motor switch in the following manner. An arm 160 pinned to the shaft 200 has a stud 161 engaging a cam surface at one end of an arm 162 of a bellcrank 163 rotatably mounted on the shaft 250. Another arm 165 of the bellcrank 163 forms a hook for engagement with the pin 101 whereby rocking of shaft 200 causes bellcrank 163 to be rocked clockwise to close the motor switch (not shown) with the forward movement of the link 102 and through lever 99 (Fig. 3) to engage the clutch.

In the operation of the dual purpose key 31 i. e., initiation of a carriage return and register zeroizing operation or a multiplication operation, it is desirable that the automatic keyboard release mechanism be disabled until the end of the last cycle of the operation when it is again enabled. This is effected in the following manner. When bellcrank 163 and an extended arm 166 thereof is rocked clockwise, the roller 167 imparts a counterclockwise rotation to lever 168 through its depending member 169. The lever 168 has a laterally extending pin 170 (Fig. 3) which underlies one end of a lever 171, the other end of which engages a pin 172 on link 122. As the pin 170 is rocked upwardly, the lever 171 becomes operative to lower the notched end 124 of link 122 out of active engagement with the extension 125 of the keyboard release bail 126 and maintains the link 122 in this position until the last part of the last cycle of the operation.

The manner in which the machine is conditioned for a left shift of the carriage and a register resetting operation will now be described. For a more complete description of this mechanism reference is to be had to the aforementioned Patent No. 2,650,761.

It will be recalled that depression of the control key 31 rocks the shaft 200 clockwise in Fig. 9 and counter-clockwise in Fig. 10. A bellcrank 400 is pinned to the shaft 200 and has a lower arm 401 which is provided with a stud 402 for the purposes hereinafter mentioned, and an upper arm 403 which is provided with a stud 404. The stud 404 is embraced in a slot 405 in one end of link 406, with a spring 407 connecting stud 404 to the formed-over ear 408 on the adjacent end of the link 406. The other end of link 406 is pinned to an arm 410 of a hook member 411, by any suitable means such as rivet 412. The hook member 411 is rotatably mounted on an eccentric 413 pinned to the shaft 259. The hook member is provided with a second arm 414, the outer end of which is provided with a hook 415.

The shaft 259, just mentioned, is connected at its left end (Fig. 7), by means of beveled gears 260 to a shaft 261 which in turn is connected by beveled gears 262 to main drive shaft 62. By this means the shaft 259 is rotated in synchronism with the main drive shaft. It is thus obvious that the hook member 411 continuously rocks on its eccentric mounting in synchronism with the main drive shaft whenever the main clutch 88 is engaged and the motor is running.

A bellcrank 420 is pinned to a shaft 250 in a plane immediately adjacent that of the hook 415 (Figs. 9 and 10). The upper arm 421 of the bellcrank is provided with a stud 422 which, when the hook member 411 is rocked clockwise through rocking of the shaft 200, will be engaged by the hook 415 during its continuous reciprocation. However, when the shaft 200 is in its normal setting, the counter-clockwise position shown in Fig. 9, the reciprocating hook 415 cannot engage the stud 422. When the hook 415 is rocked to its operative position (clockwise of that shown in Fig. 9) the hook, at its extreme leftward travel will engage the stud 422 and thereupon will rock the bellcrank 420 and the shaft 250 clockwise. It will be understood that the hook 415 is effective to pull bellcrank 420 and shaft 250 clockwise only after the member 411 has been rocked clockwise on its eccentric, for otherwise the hook will not travel in a path which will bring it into engagement with stud 422.

The lower arm 423 of the bell crank 420 is provided with a latching stud 424. Associated with the latching stud 424 is a latching member 425 pivotally mounted on a pin 252 supported by the bracket member 426. The latch 425 is pulled counter-clockwise by a spring 427 tensioned between it and the bracket 426. The latch has a shoulder 428 adapted to engage the pin 424 on the arm 423, thereby latching the bellcrank 420 and shaft 250 in the operative or clutch-engaging position. The latch member 425 is also provided with extension 429 which is engaged by the pin 402 on the bellcrank 400 when the bellcrank and its shaft 200 are rocked in a counter-clockwise direction (Fig. 9), thereby raising the latch 425 and releasing the shaft 250 for counter-clockwise rotation. As the bellcrank 420 is locked in its rocked position by the latch 425, the rocking of the eccentrically mounted hook 411 is effective to pull it to its extreme latched position and is thereafter disengaged therefrom.

Rocking of the shaft 250 causes engagement of the left shift clutch and zero resetting or clear clutch as will now be explained. Referring to Fig. 10 the shaft 250 has an arm 266 secured thereto, on which a pusher arm 268 is pivoted by any suitable means, such as pin 267. The pusher arm 268 has a shoulder 269 engaging a pin 270 on an arm 271 which is secured to sleeve 272 rotatably mounted on a shaft 273. Sleeve 272 also carries an arm 274 having a pin 275 thereon which engages a left shift push rod 176 (Fig. 9). Hence, rotation of shaft 250 rocks the arm 274 counterclockwise to move the push rod 176 rearward. This rearward movement of push rod 176 engages the left shift clutch (not shown) and causes the carriage to be shifted to the left in a well-known manner.

Referring to Fig. 6, shaft 250 has secured thereto an arm 280, which carries a pusher arm 281 pivotally mounted thereon at 282. The pusher arm 281 engages a push rod 180 so that rocking of the shaft 250 also causes engagement of the clear clutch (not shown) in the same manner as described in the said Patent No. 2,650,761.

After the carriage 16 has reached its leftmost position and the zero resetting operation has been effected, a well-known mechanism becomes operative to rock shaft 181 clockwise (Fig. 6), and counter-clockwise (Fig. 10) as disclosed in the aforementioned patent to Carl M. Friden No. 2,399,917.

Secured to shaft 181 (Figs. 6 and 10) are the arms 288 and 289, each having a bent-over portion thereon underlying the pusher arm 268 and arm 290, respectively. Counter-clockwise rotation of arm 288, therefore, raises the pusher arm 268 from engagement with the pin 270 permitting the restoration of the push rod 176 (Fig. 9) to its normally inactive position under the urgency of its spring thereby disengaging the left shift clutch. Likewise, clockwise rotation of arm 289, therefore, imparts a counter-clockwise rocking movement to arm 290 (Fig. 6) which is rotatably mounted on shaft 250, and through an overlying stud 291 on pusher arm 281, raises the pusher arm out of active engagement with the push rod 180. The spring then becomes operative to restore the push rod 180 to its normally inactive position and disengages the clear clutch.

Means for releasing the latch arm 154 from engagement with the nose 152 of the member 144, whereby the control key 31 is free to rise to its normal position, will be described hereinafter in connection with the multiplication operations.

*Multiplier mechanism*

The selection mechanism for the multiplier factor is of the type disclosed in said Patent No. 2,399,917. Generally, such mechanism comprises a ten-key keyboard including keys 34 (Figs. 1 and 7), and a pin carriage 301 associated therewith.

The differentially adjusted positions of elements 303 are utilized to control the number of registrations of the multiplicand in the accumulator 16 and to shift the accumulator from left to right after multiplication by each multiplier digit to enable correct registration of the next ordinal product, as well as to shift the pin carriage 301 so that the next higher order element 303 comes into controlling position with respect to the operation of the machine. To enable exercise of the above control, means is provided for returning each adjusted element step-by-step to its initial position, this operation being successive from the adjusted rack of the lowest order with the shifting of the accumulator and the multiplier pin carriage following the last step of movement of each rack to condition the machine for operation in the next higher order.

*Registration sign character control*

A manually selective control key 36 (Figs. 1, 6 and 7) is provided to control the sign character registration of the product in the accumulator, or to condition the multiplication mechanism for erasing factors erroneously set into the multiplier pin carriage without entry of values into the accumulator.

The control key 36 is secured to a link 210 (Figs. 6 and 7) by suitable screws. On the link 210 is a bent-over portion 211 at right angles thereto forming a rectangular surface on which the symbols +, C, and − are indicated in that order as seen in Fig. 6. With the key 36 in the normal position shown the plus symbol may be viewed through the window 37 as seen in Fig. 1. A detent 212 maintains the link 210 in its adjusted position until the end of the multiplying operation when it is restored to the position shown in Figs. 6 and 7. In each detented position of the link 210, as the key 36 is moved forwardly, the symbols C and − will appear in the window 37 in that order. The forward movement of the link 210 rocks the shaft 213 and arm 214 pinned thereto counter-clockwise through the pin-and-slot connection 215 with the link 210. Secured to one end of the shaft 213, which is journalled in side frame 138 and frame plate 139, is an arm 216 (Fig. 11) pivotally connected to one end of a link 217. At its other end the link 217 is connected to a camming member 218 pivoted at 219 to frame plate 139. In the normal position shown in Fig. 12, an extended arm 220 of camming member 218 engages a roller 221 on a lever 222 which is rotatably mounted on a shaft 223 and carries at its rearward end a stud 357. In this normal position of the lever 222 the stud 357 is maintained out of active engagement with the top edge 363 of the setting arm 362. Thus, the setting arm 362 and notch 366 are free to be rocked into engagement with the stud 367 on lever 368 when a positive multiplication operation is initiated.

Normally notched end 366 of arm 362 is maintained below pin 367 as shown in Fig. 12, but can move to active position into engagement with pin 367 under influence of spring 361 when lever 222 is moved to the active position shown. It will be noted that spring 361 provides a yieldable connection whereby arm 362 can be held against movement to active position or moved from active position. Arm 362 engages pin 350 on lever 369 pivoted on the frame and having an ear 371 overlying a stop on the pin carriage 301 in the right-hand, or normally inactive position of pin carriage 301, and the active adjustable elements 303 in any shifted position. Therefore, unless a value is set into the pin carriage, no setting of arm 362 can be made.

To condition the multiplication mechanism for a negative multiplication operation the manual control key 36 (Figs. 6 and 7) is selectively moved forwardly to its third position where the minus symbol is viewed in the window 37 and the link 210 is held by detent 212. This forward movement of the link 210 through arm 214 rocks the shaft 213 counter-clockwise in Figs. 6 and 7 and clockwise in Fig. 11. Thus, the arm 216 on shaft 213 through the link 217 (Fig. 12) rocks the camming member 218 and an extended arm 224 thereof clockwise to engage a roller 225 on the lever 226, which is rotatably mounted on shaft 223, thereby rocking the forward end of lever 226 downwardly. The rearward end (not shown) of lever 226 lies in a plane adjacent the rearward end of lever 222 and carries a stud which normally overlies the top edge of an arm 374, the notched end of which is thereby held out of engagement with its associated stud 377 on lever 368. The clockwise rocking movement of the lever 226, therefore, moves the stud on the rearward end thereof upwardly to free the arm 374 and the notch therein for engagement with the stud 377 upon the initiation of a negative multiplication operation.

As the camming member 218 is rocked clockwise (Fig. 12), the lever 222 is urged to its inactive position by a spring 227 and the stud 357 at the rearward end thereof is moved downwardly into engagement with arm 362 rendering it inoperative.

Arm 374 also has an upward extension engaging pin 350 on lever 369 (Fig. 12), hence, as explained above, the arm 362 or arm 374 can only move to active position if lever 369 is free for movement because of entry of a value into the multiplier pin carriage. Each adjustable element 303 of the multiplier pin carriage, when in active position, is returned step-by-step and during its last step of movement, the active element 303 (Figs. 6 and 12) engages lever 369 and pin 359 overlying the end of the arm 362 or 374 to move either arm out of engagement with its respective stud 367 or 377 to allow the lever 368, shaft 79, and the plus-minus gears to restore to their neutral position. With the lever 368 in its centralized position, the rocking movement of lever 369 becomes operative also to initiate a right shift of the accumulator carriage and the pin carriage in the same manner as described in said Patent No. 2,399,917.

It is desirable in a negative multiplication operation to disable the zero resetting mechanism so that, although the carriage is shifted to its leftmost position upon initiation of the operation, any factor standing in the accumulator and revolutions counter registers will not be cleared out.

For this purpose, clockwise rocking of the member 218 (Fig. 12) serves to rock a shaft 228 counter-clockwise through an upstanding arm 229 pinned thereon and a link 230, the bifurcated end of which is urged by a spring 231 into engagement with a pin 232 on a depending portion of camming member 218. Secured to the other end of the shaft 228, which is suitably journalled in frame plate 139 and side frame 138, is an arm 249 (Fig. 6) carrying a roller 233 engaging one end of a lever 234 rotatable on shaft 250. The other end of the lever 234 has an ear 235 formed at right angles thereto and underlying a depending portion 236 of the pusher arm 281. Thus it can be seen that the clockwise rotation of the member 218 (Fig. 12) will rock the shaft 228 counter-clockwise or clockwise in Fig. 6 to raise the rearward end of the lever 234 and the ear 235 thereby rocking the pusher arm 281 out of operative engagement with the push rod 180. Therefore the subsequent rocking of shaft 250 and arm 280 is ineffective to engage the clear clutch.

The second or intermediate detented position of the key 36, and therefore the link 210, conditions the multiplication mechanism to correct an erroneous factor set in the multiplier pin carriage 301. It is also desirable in this operation, as in the negative multiplication operation, to disable the zero resetting mechanism. This is to prevent the clearing out of any factor standing in the accumulator which is to be used in a negative multiplication operation following the multiplier correction cycle.

The mechanism for determining a multiplier correction operation will now be described. As the key 36 and its associated link 210 (Figs. 6 and 7) are moved forwardly to the second or intermediate detented position thereof, the arm 214 and hence the shaft 213 are rocked counter-clockwise in a predetermined arc to rotate the member 218 clockwise (Fig. 12) through the arm 216 and link 217. This predetermined arcual rotation of member 218 is sufficient to permit either of the levers 222 or 226 to be restored to its inactive position under the urgency of its spring. Therefore, a multiplication operation will not ensue upon initiation of a multiplier correction cycle.

As in the negative multiplication operation previously described, the clockwise rocking movement of the member 218 (Fig. 12) through the link 230, arm 229, and shaft 228, rocks the arm 249 (Fig. 6) clockwise to raise the ear 235 of the lever 234 thereby rendering the pusher arm 281 inoperative to engage the clear clutch.

It is desirable in a multiplier correction operation, i. e., in erasing an erroneous multiplier factor in the dials 35 of the pin carriage 301, to disable the automatic keyboard clearing mechanism, even though the "add" key 28 has been moved to its active position. Thus, the value set in the keyboard will remain for use in the multiplication operation to follow.

The aforesaid keyboard clear disabling means will now be described in accordance with the movement of the link 210 to its multiplier correction position. This movement of the link 210 causes a counter-clockwise rotation of an arm 237 (Fig. 6), which is secured to the shaft 213, to move the roller 238 thereon into engagement with a flat 239 of the V nose on an arm 240. As the roller 238 is rocked to this position, the arm 240 and the shaft 241, to which it is pinned, are given a clockwise rotation. Extending transversely of the machine and journalled in the frames 138 and 46, the shaft 241 serves to impart a clockwise rotation to a bellcrank 242 (Fig. 3) which has a fork 243 engaging a lug 244 on a lever 245 pivoted at 246. The lever 245 has an ear 247 overlying the lip of the notched end 124 of link 122. The ear 247, therefore, becomes operative, upon clockwise rotation of shaft 241, to rock the notched end 124 out of active engagement with the extension 125 of the keyboard release bail 126. Thus, with the "add" key 28 in its forward position, whereby the link 111 is in engagement with pin 120, the lip of the notched end 124 reciprocates idly beneath the ear 247. At the conclusion of the operation the pertinent parts are restored to their normally inactive position by a spring 248.

Referring to Fig. 12, mechanism has been provided, preferably, to restore the selective control key 36 to its positive multiplication position, as shown, following the negative multiplication or multiplier correction operation. This resetting mechanism is conditioned, upon rotation of member 218, by the link 253 pivotally connected at one end to the camming member 218 and at its other end to a bellcrank 254. Slidably mounted on the bellcrank 254 is a resetting member 255, which has at its forward end a roller 256 and a slot (not shown) embracing a pivot stud 257. At its rearward end the resetting member 255 carries a stud 258, guided by a slot 260 in one arm of the bellcrank 254 and forming a pin-and-slot connection with the depending arm 261 pivoted at 262. Intermediate its ends, the arm 261 has, pivotally secured thereto, a link 263 pivoted to an arm 264, which is pinned to a shaft 265 journalled in a bracket 292 on the vertical frame plate 139 and side frame 138.

Secured to the shaft 265 is a relatively long depending pin 293 (Figs. 7 and 8) which is positioned for cooperation with the tapered end 294 of a cylindrical bushing 295 mounted on the left side bracket of the pin carriage 301 for lateral movement therewith on the guide shaft 297.

To perform an automatic multiplication operation or to correct an erroneous multiplier factor, the pin carriage 301 is ordinally shifted to the right. When it has reached its normally inactive position, the pin carriage is given one more idle shift which is used to restore the pins in the highest order and to release the control key latch in the same manner as shown in said Patent No.

2,399,917. This latter operation it to be described hereinafter. Following this idle shift, the pin carriage 301 returns one step to its normally inactive position under the urgency of a relatively strong spring. This idle shift or overstroke of the pin carriage 301 also serves to restore the control key 36 to the positive multiplication position after a negative multiplication or multiplier correction operation. This is accomplished as follows:

When the control key 36 is moved forwardly from its normal position shown in Figs. 1, 6 and 7, the clockwise rotation of the camming member 218 (Fig. 12) through the link 253 rocks the bellcrank 254 counter-clockwise about its pivot 257. This rocking movement of the bellcrank 254 positions the resetting member 255 and the roller 256 thereon for cooperation with the cam 296, which is pinned to the main drive shaft 62. At the same time the stud 258 on the member 255 is moved to the bottom of the slot in the end of the arm 261 for cooperation therewith.

The idle shift or overstroke of the pin carriage, in the last cycle of the operation, then becomes operative to cause the tapered nose 294 of the bushing 295 to cam the pin 293 and the shaft 265 in a clockwise direction (Fig. 7) and counter-clockwise in Fig. 12. This rotation of the shaft 265, thru the arm 264 and link 263, causes the arm 261 to slide the resetting member 255 and the roller 256 forwardly for operative engagement with the cam 296 in the last cycle of the machine.

It will be remembered, as explained above, that the pin carriage 301 is spring-urged to its normally inactive position immediately following the overstroke thereof. As shown in Fig. 8, with the carriage 301 in its normally inactive position the bushing 295 is no longer operative to retain the shaft 265 in its rocked position. For this purpose, therefore, a latch 304 (Fig. 12) has been provided. One arm 305 of the latching member 304 is urged into engagement with a stud 306 on the cam 296 by a spring 307. Thus, when the cam 296 moves out of its full-cycle position shown, the spring 307 causes the hook nose 308 of the latch 304 to engage an extension of the pivot pin 309 to hold the resetting member 255 extended against the urgency of its spring 310, which is hooked at its one end to a depending ear 311 of the bellcrank 254. Therefore, as the shaft 62 rotates counter-clockwise in driving the machine, the cam 296 secured thereto becomes effective in the last part of the last cycle to engage the roller 256 and rock the bellcrank 254 clockwise thereby restoring the key 36 to its initial position. Immediately following this the stud 306 on the cam 296 engages the arm 305 of the latch 304 to release the hooked nose 308 thereof from the pin 309, whereby the arm 261, link 263, arm 264, shaft 265, and the pin 293 are restored to their normal positions by the spring 310 and resetting member 255.

*Release for the multiplication and return clear control key*

The release of the multiplication and return clear control key 31 (Figs. 1 and 4) is controlled in the manner disclosed in said Patent No. 2,399,917. Briefly, as the pin carriage 301 is shifted to its normal inactive position it engages the upright end of pivoted spring-urged bellcrank 342 to effect rocking movement thereof. As seen in Figs. 6 and 7, the other end 341 of bellcrank 342 is operatively related to the lower end of lever 156 of the key latch assembly so that the rocking movement of bellcrank 342 acts to move the ear 153 of the latch arm 154 out of engagement with the V nose 152 of the depressed member 144, which is therefore free to rise. Hence, the arm 142 rotates the shaft 137 and arm 140 counter-clockwise (Fig. 4) to restore the control key 31 to its normal position.

*Operation*

The operation of the machine will be summarized briefly with respect to the various multiplication operations and return clear operation controlled by the key 31. Entry of the multiplicand in the keyboard by depression of selected keys 22 and setting of the multiplier factor into the pin carriage 301 by depression of selected keys 34 serves to cause an escapement shifting of the pin carriage a number of steps corresponding to the number of multiplier digits. Assuming then that the sign character control key 36 is in its normal position, as shown in Figs. 6 and 7 for a positive multiplication operation, depression of the control key 31 rocks the shaft 137 and the arm 142 to depress the member 144 which controls the lever 146 to rock the shaft 200. This rotation of the shaft 200 serves to condition the mechanism for engaging the carriage left shift clutch and the zero resetting or return clear clutch. Rocking of shaft 200 also serves to engage the driving clutch and to close the motor circuit. Simultaneously, depression of the member 144 rocks the arm 382 and arm 384 integral therewith to move the link 386 forwardly, thereby rocking the bellcrank 387 (Fig. 12) counter-clockwise about its pivot 388 to tension the spring 361. Therefore, with the key 36 set for a positive multiplication operation, the stud 357 on the rearward end of lever 222 is rocked out of engagement with the setting arm 362 so that it is free to rise and engage the notch 366 with the stud 367 when the accumulator carriage reaches its leftmost position.

After the carriage has been shifted to its leftmost position and the registers have been zeroized, the arms 288, 289 (Figs. 6 and 10) become effective through rocking of the shaft 181 to raise the left shift pusher arm 268 and clear pusher arm 281 to release their respective clutches and initiate a multiplication operation. To raise the pusher arm 291 through the stud 291, the arm 290 is rocked and a stud 315 at one end thereof engaging a notch in a link 316 imparts a clockwise rotation to the shaft 438 through an arm 317.

Referring now to Fig. 12, rocking of the shaft 439 moves the latch pawl 436 from beneath the stud 437 on the lever 416. Consequently, the forward end of the lever 416 is free to drop under the urgency of a spring 422 since the depression of the control key 31 has rotated the shaft 137, bellcrank 429, and stud 432 thereon counter-clockwise to release the latch bellcrank 426 from its engagement with an ear at the forward end of lever 416. Releasing the lever 416 for movement initiates the automatic multiplication cycle. For a more complete disclosure of this automatic multiplication cycle reference is to be had to Patent No. 2,399,917.

The operational control from the key 31 for a negative multiplication operation is the same as that for the positive multiplication operation except as follows.

With the sign character control key 36 positioned for a negative multiplication operation the camming member 218 moves the arm 229 counter-clockwise (Fig. 12) through link 230 to rock the shaft 228 and the arm 249 clockwise (Fig. 6) thereby causing the lever 234 and the ear 235 thereon to raise the pusher arm 281 out of active engagement with the push rod 180. Thus, a zero resetting operation is prevented even though depression of the control key 31 is effective through shaft 200 to cause the shaft 250 to be rotated. However, this rotation of the shaft 250 is utilized to engage the left shift clutch whereby the register carriage is shifted to its leftmost position where it becomes effective to rock the shaft 181 and the arms 288, 289 to disable the left shift pusher arm 268 (Fig. 10) and rock the arm 290 and therefore the shaft 438 clockwise in Fig. 6. Thus, the latch pawl 436 (Fig. 12) is moved from beneath the stud 437 permitting the forward end of the lever 416 to drop, thereby causing the setting arm 374 to engage the stud 377 since the rocking of the camming member 218 has moved the lever 226 clockwise to enable the setting arm 374 to be raised under the urgency of its spring (not shown). Consequently, a negative registration is effected in the accumulator registers.

To perform a multiplier correction operation the manual selection key 36 is moved to its second or middle detented position and although the register carriage is shifted to the left, upon depression of the control key 31, the zero resetting mechanism is disabled as in the negative multiplication operation described above. It is desirable, however, during the multiplier correction cycle, to prevent registration in the accumulator dials. Therefore, when the camming member 218 is rocked one-half of its arcual movement, the levers 222 and 226 (Fig. 12) are restored to their inactive positions by their respective springs. Thus, the setting arms 362 and 374 are held from engagement with their respective studs 367 and 377 while the adjustable elements 303 (Fig. 7) and their associated dials 35 are restored step-by-step to 0 in the same manner as shown in the aforesaid Patent No. 2,399,917.

The depression of the control key 31 for a carriage return and clear operation will now be described.

When there is no multiplier factor entered in the pin carriage 301 and, therefore, the pin carriage has not been moved from its inactive or rightmost position, the automatic multiplication mechanism is disabled as disclosed in the said Patent No. 2,399,917.

With this in mind, it will be recalled that depression of the control key 31 through shaft 137 (Figs. 1 and 6) rocks the arm 142 to depress the member 144 and through lever 148 and arm 151 rotates the shaft 200. This rotation of the shaft 200 and arm 403 (Fig. 9) conditions the machine for a left shift movement of the register carriage and a zero resetting operation. When the carriage has reached its leftmost position it becomes effective to rock the shaft 181 and the arms 288, 289 (Figs. 6 and 10) to disable the left shift pusher arm 268 and through the arm 290 and stud 291 to raise the pusher arm 281 to its inactive position. This movement of the arm 290 through the stud 315 thereon, the link 316, and the arm 317 causes a clockwise rotation of the shaft 438. Referring now to Figs. 7 and 12, as the shaft 438 is rotated, the latch pawl 436 is moved out of engagement with the stud 437 thereby releasing the lever 416 to initiate a cycle of operation in which the pin carriage 301 is shifted one step beyond its inactive position to move the bellcrank 342 and thus release the depressed control key 31 in the same manner as shown in the said Patent No. 2,399,917.

We claim:

1. A control mechanism for calculating machines comprising: a positionable selection key operable in each of a plurality of positions to determine a machine operation, a control key for initiating a plurality of preselected operations determined by said selection key, a multiplication sign character determining means controlled by said selection key, a register zeroizing means normally operated by depression of said control key, means associated with said sign character determining means for disabling said zeroizing means in certain positions of said selection key, and a latch for maintaining said control key depressed during the initiated operation.

2. In a machine of the character described having a cyclically driven actuating mechanism, an accumulator, shifting means for said accumulator, a zero resetting mechanism for zeroizing said accumulator, and a multiplying mechanism comprising: a multiplication sign character selection key normally set for positive multiplication, a settable member controlled by said selection key for determining the sign character of a multiplication operation, a single control key for initiating a plurality of operations including multiplication predeterminable by said selection key, and means operative by said settable member to enable said zero resetting mechanism with the said selection key in its normal position and to disable the zero resetting mechanism with the said selection key moved from its normal setting when the depression of said control key is effective to enable said shifting means and initiate a multiplication operation.

3. In a calculating machine having a cyclically driven actuating mechanism, a keyboard in which the values of a multiplicand are set, an accumulator for registering the product of a multiplication operation, and a multiplying mechanism comprising: a carriage for receiving a multiplier factor, a three positional selection key operable to control said multiplying mechanism when a factor has been entered in said carriage, said key normally set in a first position for enabling positive multiplication, and having a second position adapted to enable zeroizing of the said carriage when an erroneous multiplier has been entered therein, and also a third position for the said three positional selection key adapted to enable a negative multiplication operation, a single control key for cooperation with said selection key to initiate one of a plurality of operations predetermined by said selection key, and a resetting means rendered effective by said carriage at the end of the last cycle of operation to restore said selection key to its normal position when displaced therefrom.

4. In a machine of the character described having a cyclically driven actuating mechanism, an accumulator, shifting means for said accumulator, a zero resetting mechanism for zeroizing said accumulator, and a multiplying mechanism comprising: a carriage for receiving a multiplier factor, a three positional selection key, said key normally set in a first position for enabling positive multiplication, and having a second position adapted to enable zeroizing of the said carriage when an erroneous multiplier has been entered therein, and also a third position for the said three positional selection key adapted to enable a negative multiplication operation, a control key for cooperation with the said selection key to initiate a plurality of operations, means operative with the said selection key in its second and third positions to disable the said zero resetting mechanism, and a movable member cooperating with said control key to engage said shifting means thereby moving the said accumulator to an extreme end position.

5. In a calculating machine having a cyclically driven actuating mechanism, a keyboard in which the values of a multiplicand are set, an accumulator for registering the product of a multiplication operation, and a multiplying mechanism comprising: a carriage for receiving a multiplier factor, a three positional selection key, said key normally set in a first position for enabling positive multiplication, and having a second position adapted to enable zeroizing of the said carriage when an erroneous multiplier has been entered therein, and also a third position for the said three positional selection key adapted to enable a negative multiplication operation, a control key for cooperation with said selection key to initiate a plurality of operations, a cam member associated with said carriage, a resetting means for restoring the said selection key to its normal position when displaced therefrom, said resetting means being adjustably conditioned by said cam member for operative engagement with the said cyclically driven actuating mechanism in the last cycle of operation, a latching means for retaining said resetting means in an adjusted position until the end of the last cycle of operation, and a latch releasing means controlled by the said cyclically driven actuating mechanism for causing said resetting means and said latching means to be restored to a normally inactive position.

6. In a machine of the character described having a cyclically driven actuating mechanism, a keyboard, a keyboard release mechanism, an accumulator, a shifting means for said accumulator, a zero resetting mechanism for zeroizing the said accumulator, and a multiplying mechanism comprising: a carriage for receiving a multiplier factor, a three positional selection key, said key normally set in a first position for enabling positive multiplication, and having a second position adapted to enable zeroizing of the said carriage when an erroneous multiplier has been entered therein, and also a third position for the said three positional selection key adapted to enable a negative multiplication operation, a control key for cooperation with the said selection key to initiate a plurality of operations, means operative with the said selection key in its second position and the control key depressed to disable the said keyboard release mechanism thereby retaining the value set in the said keyboard, a movable member cooperating with said control key to engage said shifting means thereby moving the said accumulator to an extreme end position, and means operative with the said selection key in its second and third positions to disable the said zero resetting mechanism upon depression of the said control key.

7. A multiplaction control mechanism for a calculating machine comprising: a cylically driven actuating means, a shiftable carriage for receiving a multiplier factor, a three positional selection key, said key normally set in a first position for enabling positive multiplication, and having a second position adapted to enable zeroizing of the said carriage when an erroneous multiplier has been entered therein, and also a third position for the said three positional selection key adapted to enable a negative multiplication operation, a control key cooperating with said selection key to initiate a plurality of operations, a resetting means effective at the end of the last cycle of operation to restore said selection key to its normal position when displaced therefrom, mechanism controlled by said selection key in the said second and third positions to regulate said resetting means, an adjustment means to condition said resetting means for operative engagement by said cyclically driven actuating means, a cam member associated with said carriage to control the said adjustment means with an overstroke movement of said carriage in the last cycle of operation, and a latching means cooperating with said cyclically driven actuating means and said adjustment means to retain the said resetting means in its adjusted position until the end of the last cycle, whereby the said selection key is restored to its normal position and the said latching means is released to cause the said resetting means and said adjustment means to return to a normally inactive position.

8. In a calculating machine having an ordinally shiftable carriage, a register in said carriage, a control key, shifting means for ordinally moving said shiftable carriage to an extreme end position controlled by said key, a zero resetting means preselectively controlled by the same said key adapted to restore said register to "0," and a multiplying mechanism comprising: a manipulable selection means normally operatively positioned to predetermine one operational control of said key and movable to predetermine the second operational control of said key, an ordinal multiplier receiving means, means ordinally operable by said multiplier receiving means for controlling said multiplying mechanism, and means operative by said ordinally operable means to enable an automatic movement of said manipulable selection means to its normal position when moved therefrom.

9. In a calculating machine having an ordinally shiftable carriage, a register in said carriage, shifting means for moving said shiftable carriage to an extreme end position, power setting means for engaging said shifting means, a single control key, and a multiplication mechanism rendered operative by said control key comprising: a manually operable selection means to predetermine the control of said key in a multiplication operation, a multiplier receiving means for controlling ordinal shifting of said ordinally shiftable carriage, means operative by said key to enable said power means in any position of said manually operable means, and means controlled by said multiplier receiving means for rendering said power setting means effective to engage said shifting means without the initiation of a multiplication operation upon manipulation of said control key.

10. In a machine of the character described having a keyboard, an accumulator, registers in said accumulator for receiving values set into said keyboard, means operative for causing shifting of said accumulator to an end position and zeroizing of said registers, a multipurpose control key for effecting a plurality of operations, latching means for said control key, and a multiplication mechanism comprising: a multiplier keyboard, a cyclic multiplication control mechanism operative to receive a multiplier factor from said multiplier keyboard, a manually positionable selection key normally positioned to effect operation of said multiplication mechanism upon operation of said control key, means operative to control said shifting and zeroizing means upon depression of said control key in cooperation with said selection key in a moved position thereof, means operative by said multiplication control mechanism, upon nonentry of a multiplier factor therein, to disable said multiplication mechanism and enable said last-named means in the moved position of said selection key, and a release mechanism for said latching means effective by the said cyclic control mechanism to release said control key.

References Cited in the file of this patent

UNITED STATES PATENTS

| Number | Name | Date |
|---|---|---|
| 2,286,116 | Shipley | June 9, 1942 |
| 2,399,917 | Friden et al. | May 7, 1946 |
| 2,552,789 | Hopkins | May 15, 1951 |